March 29, 1966 F. W. SUHR ET AL 3,243,620
SYNCHRONOUS INDUCTION MOTORS HAVING AN
IMPROVED ROTOR CONSTRUCTION
Filed May 1, 1963

Inventors:
Fred W. Suhr,
Joe T. Donahoo,
by Henry J. Marciniak
Attorney.

United States Patent Office 3,243,620
Patented Mar. 29, 1966

1

3,243,620
SYNCHRONOUS INDUCTION MOTORS HAVING AN IMPROVED ROTOR CONSTRUCTION
Fred W. Suhr and Joe T. Donahoo, Fort Wayne, Ind., assignors to General Electric Company, a corporation of New York
Filed May 1, 1963, Ser. No. 277,248
6 Claims. (Cl. 310—162)

This invention relates generally to synchronous induction motors. More particularly it relates to a rotor construction for use in a stator-excited synchronous induction motor for providing improved operating characteristics.

In a conventional induction motor, the maximum speed attained by the motor is below the synchronous speed. A synchronous induction motor is similar in construction to a conventional induction motor and starts as an induction motor but operates normally at synchronous speed. In a synchronous induction or reluctance motor, as they are frequently referred to, the flux paths in the rotor member are controlled to provide magnetic or salient poles in order to utilize the pull-in torque of an unexcited synchronous machine to essentially drive the motor at synchronous speed. A squirrel cage type of winding is generally used in the secondary circuit. Polyphase, split phase or capacitor types of stator winding configurations may be used in the primary circuit.

As the rotor of a synchronous induction motor approaches synchronous speed, the magnetic poles of the rotor slip by the poles of the stator magnetic field at a slower and slower rate. When the rotor has attained an angular speed such that its slippage from the angular speed of the stator-produced magnetic field is sufficiently low, the rotor attempts to accelerate into synchronism with the rotating stator field. Its ability to do so is limited by (1) the connected mechanical load, (2) the inertia of the rotor plus the connected load inertia, (3) the strength of the stator field, and (4) the angular speed increment through which it must accelerate. A low resistance squirrel cage rotor winding permits a higher induction running speed at a given mechanical torque load so that the speed increment is reduced thereby increasing its ability to pull into synchronism with the stator field as the rotor pole slips by. Higher stator field strength increases the magnetic flux in the air gap thus increasing the accelerating torque. The inertia of the rotor and its connected load inertia acts to retard rotor acceleration and thereby reduces the ability to pull into synchronism. Shaft load subtracts from the available torque to accelerate the rotor.

In many applications it is extremely desirable that the rotor pull into synchronism over a rather wide range of shaft loads and load inertias as well as permitting an applied voltage tolerance of ±10%.

When running at synchronous speed the rotor assumes an angle δ with respect to the stator field. The greater the shaft load the greater becomes the angle δ until the load becomes sufficiently great to pull the motor out of synchronism. The relationship of angle δ to shaft load is largely a function of the rotor magnetic circuit design. In some applications it is highly desirable that the angle δ increase slower as the torque load is increased so that where more than one synchronous motor is used in a given system the rotors will assume very closely the same load angle even though the loads of the motors are different. For example, in the motors used to drive tape reels in computers and communication equipment, it is required that these reels assume essentially the same angle even though the loads are different. In other words, it is necessary that the driving motors have a steep torque versus

2 load angle characteristic. Heretofore synchronous induction motors have not been adaptable for use in such applications as computers and the like because the torque versus load angle characteristics was not sufficiently steep. It is desirable, therefore, that a synhronous induction motor be provided with improved operating characteristics that will permit such a motor to be used in applications which require a steep torque versus load angle characteristic. Further, it is also desirable that other operating characteristics such as power factor, efficiency and pull-in torque be improved.

Accordingly, it is a general object of the present invention to provide an improved synchronous induction motor.

It is another object of the present invention to provide an improved synchronous induction motor having improved operating characteristics as compared with the characteristics of comparable synchronous induction motors which are commonly used at the present time.

A more specific object of the present invention is to provide an improved rotor assembly for use with the stator of a synchronous induction motor, which will provide a relatively steep torque versus load angle characteristic.

In carrying out our invention in one form thereof, we have provided a rotor assembly for use in a synchronous induction motor having a particular structural configuration. The magnetic core of the rotor assembly is formed with a central aperture having round-shaped reluctance slots extending radially outward and converging with winding slots disposed on the direct pole axes to provide at least two magnetic poles or internal saliencies. Also, formed in the core are a plurality of squirrel cage slots equally spaced near the outer periphery of the core. The squirrel cage slots and the round-shaped reluctance slots are filled with nonmagnetic and electrically conducting material extending without a bridged section from the central aperture to outer periphery of the core. The nonmagnetic and electrically conducting material may also fill a portion of the central aperture so as to embrace the shaft centrally disposed therein. If desired, instead of filling the central aperture, a sleeve of nonmagnetic material may be interposed between the rotor shaft and the magnetic core.

With the improved core assembly formed without any bridged sections along the direct pole axis and having an essentially uniform air gap reluctance except at the squirrel cage slot openings, it was found that a steep torque versus load angle characteristics was obtained. Further improvements were also obtained in other characteristics as compared with other synchronous induction motors with external saliency and with other comparable motors having bridged sections in the dividing slots.

The subject matter which I regard as my invention is particularly pointed out and distinctly claimed in the concluding portion of the specification. My invention, however, both as to organization and operation together with other objects and advantages thereof, may be best understood with reference to the following description taken in conjunction with the accompanying drawing in which:

Figure 1:
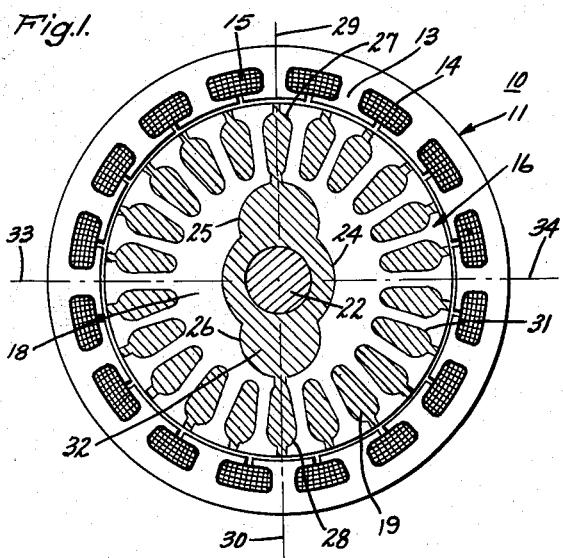
FIGURE 1 is a cross-sectional view of a synchronous induction motor embodying one form of our invention, the view being taken at a plane perpendicular to the axis of rotation of the rotor.
Figure 5:
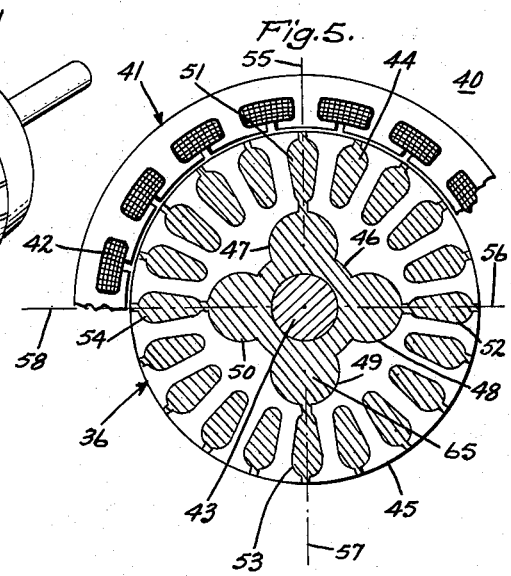
Figure 4:
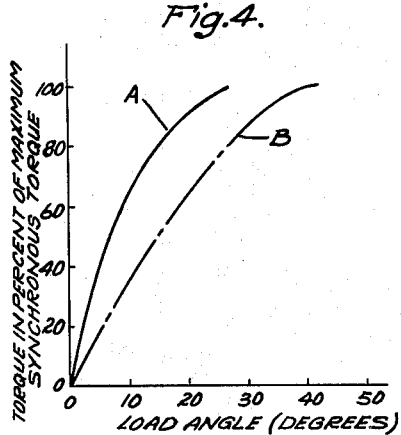

FIGURE 4 illustrates a plot of torque expressed as a percent of maximum synchronous torque versus load angle in degrees for the improved synchronous motor shown in FIGURE 1 and for a comparable motor of the prior art; and FIGURE 5 is a cross-sectional view partially broken away of a four pole synchronous induction motor taken in a plane perpendicular to the axis of shaft rotation, the view illustrating another embodiment of the invention.

For the purpose of illustration, we have shown the invention embodied in a two pole synchronous induction motor, which is generally identified by reference numeral 10. The motor 10 includes a stator 11 of the type generally used in standard induction motors, the stator 11 being formed with a plurality of equally spaced teeth 13. The teeth 13 define the winding slots 14 in which the primary winding 15 of the motor 10 is disposed. A rotor assembly 16 is supported for rotation relative to the stator 11.

Figure 3:
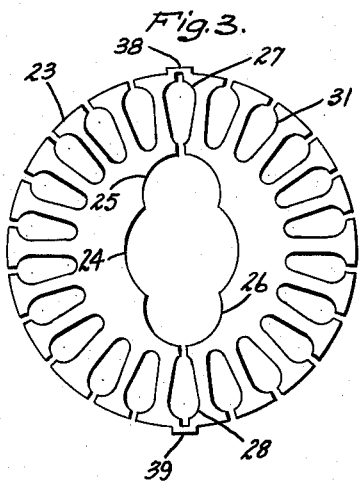
FIGURE 3 is an illustration of a single lamination of the type used in the rotor assembly shown in FIGURES 1 and 2.
Figure 2:
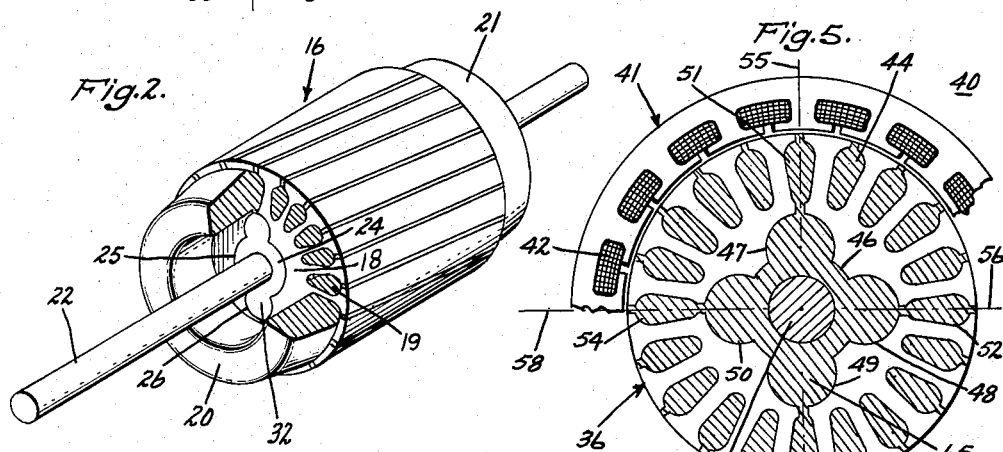
FIGURE 2 is a view in perspective, partially broken away, of the rotor assembly shown in FIGURE 1.

Referring now more specifically to FIGURES 1 and 2 of the drawing, the rotor assembly 16 is comprised of a magnetic core 18, squirrel cage conductors 19, end rings 20, 21 and a shaft 22. The magnetic core 18 is preferably made of laminations 23, as is shown in FIGURE 3. The squirrel cage conductors 19 are disposed near the periphery of the rotor assembly 16 in skewed relation. In particular, it will be noted that the laminations 23 are formed preferably with a central aperture 24 having round-shaped reluctance or dividing slots 25 and 26 extending radially outward from the central aperture 24 and converging with the squirrel cage slots 27, 28 disposed on the direct pole axes 29, 30 and the other squirrel cage slots 31 are formed with an opening at the top of the slots.

We have found that by eliminating all bridged sections between the central aperture 24 and the reluctance slots 25, 26, between the reluctance slots 25, 26 and the winding slots 27, 28 and between the winding slots 27, 28 and the outer periphery of the rotor assembly 16, and by providing an essentially uniform air gap reluctance except at the squirrel cage slot openings, it is still possible to have a rotor assembly with stator-excited magnetic poles for synchronous operation. Further, we have found that with such an arrangement significant improvements in certain operating characteristics of the motor 10 can be achieved as will hereinafter be more fully set forth.

The rotor assembly 16 shown in FIGURES 1 and 2 was constructed to provide two magnetic poles which are symmetrical about the direct pole axes 29, 30. The angle between the direct pole axes 29, 30 is divided by axes 33, 34 which are generally referred to as the quadrature axes.

Preferably, the squirrel cage conductors 19, and end rings 20, 21 are die cast with a nonmagnetic and electrically conducting material 32, which also fills the reluctance slots 25, 26 and the aperture 24. In the illustrated embodiment of the invention, the material 32 filling the aperture 24 was cast with an opening for receiving the shaft 22. The end rings 20, 21 serve to hold the rotor assembly 16 in axially assembled relation. The nonmagnetic material 32 in the winding slots 27, 28, the central aperture 24 serves as a barrier to the quadrature flux since it essentially presents a high reluctance to the quadrature axis flux.

The motor 10 shown in FIGURES 1 and 2 has essentially induction motor starting characteristics and synchronous motor operating characteristics. At standstill and speeds approaching the synchronous speed, the motor 10 operates on the induction principle. The induction characteristics are due to the closed loops defined by the squirrel cage conductors 19 and end rings 20, 21 and the resulting interaction between the stator rotating field and these loops. The induced rotor current flow causes the rotor assembly 16 to try to rotate in unison with the rotating magnetic field produced by the stator current. As the rotor approaches synchronous speed, a pair of diametrically opposed magnetic poles are produced by virtue of the internal saliency in the rotor assembly 16, and a torque tending to accelerate the rotor assembly 16 to lock in step with the rotating field is produced. Thus, the motor 10 locks in at synchronous speed utilizing the synchronous motor principle of operation.

In FIGURE 3 we have shown a lamination punching 23 such as may be used to construct the magnetic core 18 of motor 10. It will be noted that the lamination 23 as initially punched has bridged sections 38, 39 at the top of the slots 27 and 28 to facilitate assembling the laminations 23. When assembled, the stack of laminations 23 was placed in a die to form the end rings 20, 21 and the shaft opening, and the squirrel cage conductor slots, the reluctance slots 25, 26 and central aperture 24 were filled with aluminum. After the casting operation was completed, the shaft 22 was pressed into the shaft opening provided by the cast aluminum in the central aperture 24. The rotor assembly 16 was then turned on a lathe to reduce the outer diameter of the magnetic core 18 in order to provide the desired air gap between the core 18 and stator 11. In the course of this machining operation, the bridged sections 38, 39 were removed so that there is no bridged section between the winding slots 27, 28 disposed along the direct pole axes 27, 28 in the final rotor assembly. It will be appreciated, of course, that the bridged sections 38, 39 are included in the lamination stampings to avoid the more expensive segmented rotor type of construction.

By way of a more specific exemplification of our invention, a fractional horsepower single phase synchronous induction motor 10 was built with a rotor assembly 16 as shown in FIGURES 1 and 2. The main winding 15 was arranged in the stator 11 to provide two poles. The maximum stator yoke flux density was 118,000 lines per square inch. The magnetic core 18 was constructed with a 1.5 inch stack of common iron laminations, each having a thickness of approximately 0.025 inch and formed with 22 equally spaced squirrel cage slots. The stack was skewed at an angle of 22.4 electrical degrees. The central aperture 24 was formed with a radius of 0.293 of an inch and the rounded dividing or reluctance slots 25, 26 were formed with a radius of 0.26 of an inch.

In order to demonstrate the effect of bridge sections and the presence or absence of nonmagnetic aluminum in the reluctance slots and squirrel cage slots, the rotor construction of the motor 10 used in the illustrative example was variously modified. The modified motors, which are identified hereinafter as motors A, B, C, D, and E, were tested with the same stator as was used in the motor 10 of the example and included the same air gap and stator yoke flux density. Motor A was modified so that a bridged section having a thickness of .025 of an inch was provided at the outer end of the squirrel cage slots 27, 28 disposed along the direct pole axes, and the reluctance slots were filled with aluminum. In motor B a bridged section having a thickness of 0.25 of an inch was located between the direct axis winding slots 27, 28 and the reluctance slots 25, 26 which were filled with aluminum. Motor C had a bridged section at the outer end of the squirrel cage slots 27, 28 identical to the bridged section used in motor A but the reluctance slots 25, 26 and squirrel cage slots 27, 28 were not filled with aluminum. In motors D and E the reluctance slots were not filled with aluminum and the squirrel cage slots 27, 28 on the direct axis were filled with aluminum. A bridged section having a thickness of 0.25 of an inch was included under the slots 27, 28 in motor D, and in motor E at the top of the slots 27, 28.

In Table I we have summarized the operating characteristics for the motor example and the modified motors A, B, C, D and E. The values for the pull-out torque, pull-in torque, efficiency and change in load angle given in Table I were determined at an operating voltage of 103 volts, which represents a voltage of ten percent below the normal rated voltage of the motor.

Table I

| Motor | Pull-out Torque (oz. in.) | Pull-in Torque (oz. in.) | Efficiency (percent) | Increase in load angle between torques of 4 and 12 oz. in. (degrees) |
| --- | --- | --- | --- | --- |
| Motor of Example | 16.5 | 16.25 | 43.9 | 9 |
| A | 14.2 | 14.08 | 36.8 | 12 |
| B | 12.8 | 12.7 | 36.0 | 13.0 |
| C | 14.48 | 14.33 | 37.5 | 11.0 |
| D | 13.3 | 13.2 | 35.9 | 14.0 |
| E | 13.52 | 13.48 | 36.1 | 13.0 |

From the summary presented in Table I, it will be apparent that the operating characteristics of the motors are affected by the presence of bridge sections above or below the squirrel cage slots 27, 28 on the direct pole axes 29, 30. An unexpected benefit resulting from the improved arrangement is the significantly small change in the load angle between torques of 4 and 12 ounces-inches, indicating a relatively steep torque versus load angle characteristic. It will be appreciated that all of the modified motors A, B, C, D and E utilized the improved rotor construction having rounded reluctance slot configurations, without external salients.

In order to further demonstrate the advantage of the improved motor construction as compared with a conventional synchronous induction motor as is shown in the Morrill et al. Patent 1,915,069 employing a copper riveted rotor, the motor 10 shown in FIGURE 1 was constructed with a copper squirrel cage. The comparative data for the two motors is set forth in Table II.

Table II

|  | Morrill Motor | Improved Motor |
| --- | --- | --- |
| Load Angle Change From 4 to 12 oz. in., degrees | 13.5 | 9 |
| Load Angle Change From 0 to 14 oz. in., degrees | 23.0 | 15 |
| Load Angle at Pull-out, degrees | 45.0 | 27 |
| Pull-out Torque, oz. in | 19.33 | 19.06 |
| Pull-in Torque, oz. in | 19.15 | 18.10 |
| Full Load Efficiency, percent | 47.6 | 49.5 |
| Full Load Watts | 78.1 | 75.2 |
| Full Load Amperes | 1.75 | 1.22 |
| No Load Watts | 28.1 | 27.8 |
| No Load Amperes | 1.374 | 0.989 |
| Stator Punching Diameter, inches | 3.700 | 3.20 |
| Stack Height, inches | 1.875 | 1.5 |

An important advantage of the improved motor is that it is characterized by a relatively steep torque versus load angle characteristic, as is apparent from the data in Table II and curves A and B shown in FIGURE 4. The data for these curves were obtained by first determining the maximum sustained torque of the motor at synchronous speed and then observing the load angle with a stroboscope and compass mounted on the shaft as the applied torque is increased to the maximum value. Curve A represents a plot of the values of the torque expressed as a percent of the maximum synchronous torque and load angle for the improved motor 10 of the illustrative example with the copper rotor design while curve B represents the torque versus load angle characteristics of comparable motor having the rotor and slot arrangement disclosed in the Morrill at et. Patent 1,915,069 and having the characteristics set forth in Table II.

The improved torque versus load angle characteristics of the motors embodying the invention make it possible to employ synchronous induction motors in a wider range of applications. For example, the improved motors are suitable for applications in computers and communication equipment where a steep torque versus load angle characteristic is required.

Referring now to FIGURE 5, we have illustrated therein a four pole synchronous motor 40 embodying the invention. The stator 41 is of the type generally used in a standard induction motor with a main winding 42 arranged to provide a rotating main field having four poles. A rotor assembly 36 is supported for relative rotation with respect to the stator 41 and includes a shaft 43, a plurality of cast or fabricated squirrel cage conductors 44, a magnetic core 45 and end rings which are not shown. The central or hub aperture 46 is formed with four radially extending arcuate reluctance slots 47, 48, 49 and 50. These reluctance slots converge with the squirrel cage slots 51, 52, 53, 54 which are disposed along the direct pole axes 55, 56, 57, 58. The central aperture 46, the reluctance slots 47, 48, 49, 50, and the squirrel cage slots 51, 52, 53, 54 are filled with non-magnetic and electrically conducting material 55 which extends from the central aperture 46 to the outer periphery of the magnetic core 45 without any intervening bridged sections. Thus, the magnetic core 45 is divided into four sectors which, essentially, are magnetically separated. Although I have filled central aperture 46 with nonmagnetic material 55, it will be appreciated that a nonmagnetic sleeve may be inserted in the central aperture 55 to control the flux path in the core 45 or if the shaft 43 is made of nonmagnetic material, it may perform this function.

The motor 40 shown in FIGURE 5 operates in a similar fashion as the motor 10 shown in FIGURE 1. The motor 40 is started as an induction machine, the interaction of the stator rotating field with the conductors 44 providing the starting torque. When the rotor assembly 60 is brought up to the speed where it comes into step with the revolving field of the stator 41, synchronous speed is attained.

From the foregoing description of the improved rotor constructions embodying the invention, it will be apparent that the operating characteristics of synchronous induction motors, particularly the torque versus load angle characteristic, can be improved. Although in the two illustrated embodiments the invention was incorporated in two and four pole motors, it will be appreciated that the invention may be utilized in other multipolar machines.

While we have shown and described what is presently considered to be the preferred embodiments of our invention, it will be apparent to those skilled in the art that many changes and modifications may be made in the structures disclosed herein without actually departing from the true spirit and scope of the invention. It is therefore intended in the appended claims to cover all such equivalent variations as fall within the invention.

What I claim as new and desire to secure by Letters Patent of the United States is:

1. A synchronous induction motor comprising: a stator, a rotor assembly rotatably supported to said rotor, said rotor assembly including a shaft and a magnetic core, said magnetic core having a plurality of squirrel cage slots equally spaced near the outer periphery of the magnetic core, said core providing a substantially uniform air gap reluctance except at the squirrel cage slot openings and defining at least two magnetic poles having a direct pole axis, said magnetic core being formed with a central aperture having arcuate reluctance slots extending radially outward to interconnect with the winding slots disposed along the direct pole axes, and a nonmagnetic and electrically conducting material filling said squirrel cage slots and arcuate reluctance slots and extending without a bridged section from the central aperture to the outer periphery of said magnetic core.

2. In a stator-excited synchronous induction motor, a rotor assembly comprising a magnetic core having an even number of magnetic poles having direct pole axes, said magnetic poles having squirrel cage slots of uniform size equally spaced near the periphery of said magnetic core, said magnetic poles being separated by axially extending round-shaped reluctance slots extending radially outward of a central aperture and converging with said winding slots along the direct pole axes, a shaft disposed within the central aperture, and a nonmagnetic electrically conducting material filling the squirrel cage slots and interconnected at the ends thereof to form a squirrel cage winding and said material filling said central aperture and round-shaped reluctance slots to provide a continuous flux barrier extending from the central aperture to the outer periphery of said magnetic core.

3. A stator-excited synchronous induction motor comprising: a stator with a distributed winding for providing rotating field poles, a rotor assembly rotatably supported for rotation relative to said stator and positioned within said stator, said rotor assembly comprising a shaft and a magnetic core carried by said shaft, said magnetic core having a plurality of squirrel cage slots uniformly spaced near the outer periphery of the magnetic core and providing at least two magnetic poles, each of said poles having a direct pole axis, said magnetic core being formed with a central aperture having reluctance slots extending radially outward and converging with winding slots disposed on the direct pole axes, and a nonmagnetic and electrically conducting material filling said squirrel cage slots and said reluctance slots and forming a flux barrier extending without a bridged section from the central aperture to the outer periphery of said magnetic core.

4. A synchronous induction motor comprising: a stator, a rotor assembly rotatably supported relative to said stator, said rotor assembly including a shaft and a magnetic core, said magnetic core having a pair of magnetic poles, said magnetic poles having squirrel cage windings equally spaced near the periphery thereof, said core providing an essentially uniform air gap reluctance except at the squirrel cage slot openings, a pair of said squirrel cage winding slots being disposed along the direct pole axis, said magnetic core being formed with a central aperture having a pair of round-shaped reluctance slots extending radially from said central aperture and converging with said squirrel cage slots disposed along the direct pole axes, and a nonmagnetic and electrically conducting material filling said squirrel cage slots and said reluctance slots, said material forming a continuous flux barrier dividing said magnetic poles and extending from said central aperture to the outer periphery of said magnetic core.

5. A self-excited synchronous induction motor comprising: a stator, a rotor assembly rotatably assembled relative to said stator, said rotor assembly including a shaft and a magnetic core carried on said shaft, said magnetic core having four magnetic poles, said magnetic poles having squirrel cage winding slots equally spaced near the magnetic core and separated by four round-shaped reluctance slots extending radially outward from a central aperture on the direct pole axes of the magnetic core and converging with four of said winding slots, said squirrel cage slots being filled with nonmagnetic and electrically conducting material interconnected at the ends thereof to form a squirrel cage winding, said material filling said round-shaped reluctance slots to provide a continuous barrier for magnetic flux extending from the central aperture to the outer periphery of said core to divide said magnetic poles.

6. A rotor assembly for use in a stator-excited synchronous induction motor comprising: a cylindrical magnetic core having a pair of magnetic poles, said magnetic core having uniform squirrel cage slots equally spaced near the periphery of said core and providing an essentially uniform air gap reluctance except at the squirrel cage slot openings, a pair of reluctance slots converging with a pair of winding slots disposed on direct pole axes and extending outwardly of a central aperture, said squirrel cage slots being filled with a nonmagnetic material interconnected at the ends of said magnetic core to form a squirrel cage winding, said nonmagnetic material, said central aperture and said reluctance slots being filled with nonmagnetic material extending without an intervening bridged section from the central aperture to the outer periphery of said cylindrical magnetic core, and a shaft disposed in said central aperture, said nonmagnetic material embracing said shaft.

References Cited by the Examiner
UNITED STATES PATENTS

| | | | |
|---|---|---|---|
| 2,483,848 | 10/1949 | Saretsky | 310—162 |
| 2,913,607 | 11/1959 | Douglas et al. | 310—261 |

ORIS L. RADER, *Primary Examiner.*

MILTON O. HIRSHFIELD, *Examiner.*

D. F. DUGGAN, *Assistant Examiner.*